United States Patent
Miyake (10) Patent No.: US 11,229,978 B2
(45) Date of Patent: Jan. 25, 2022

(54) BRAZING SHEET FOR FLUX-FREE BRAZING, METHOD FOR FLUX-FREE BRAZING AND METHOD FOR MANUFACTURING HEAT EXCHANGER

(71) Applicant: MITSUBISHI ALUMINUM CO., LTD., Tokyo (JP)

(72) Inventor: Hideyuki Miyake, Shizuoka (JP)

(73) Assignee: MITSUBISHI ALUMINUM CO., LTD., Tokyo (JP)

( * ) Notice: Subject to any disclaimer, the term of this patent is extended or adjusted under 35 U.S.C. 154(b) by 232 days.

(21) Appl. No.: 16/470,541

(22) PCT Filed: Oct. 12, 2017

(86) PCT No.: PCT/JP2017/036921
§ 371 (c)(1),
(2) Date: Jun. 17, 2019

(87) PCT Pub. No.: WO2018/123203
PCT Pub. Date: Jul. 5, 2018

(65) Prior Publication Data
US 2020/0086428 A1    Mar. 19, 2020

(30) Foreign Application Priority Data

Dec. 27, 2016  (JP) .............................. JP2016-253307
Feb. 21, 2017  (JP) .............................. JP2017-030181

(51) Int. Cl.
*B32B 15/01*     (2006.01)
*B23K 35/02*     (2006.01)
(Continued)

(52) U.S. Cl.
CPC ........ *B23K 35/0238* (2013.01); *B23K 1/0012* (2013.01); *B23K 35/286* (2013.01);
(Continued)

(58) Field of Classification Search
None
See application file for complete search history.

(56) References Cited

U.S. PATENT DOCUMENTS

2011/0111254 A1    5/2011  Wittebrood et al.
2012/0177947 A1*   7/2012  Abrahamsson ....... B32B 15/016
                                                 428/654
(Continued)

FOREIGN PATENT DOCUMENTS

CN    102089117 A    6/2011
CN    104395028 A    3/2015
(Continued)

OTHER PUBLICATIONS

Extended European Search Report (EESR) dated Jan. 8, 2020 issued in counterpart European Application No. 17886201 7.
(Continued)

*Primary Examiner* — Daniel J. Schleis
(74) *Attorney, Agent, or Firm* — Holtz, Holtz & Volek PC (57) ABSTRACT

A brazing sheet for flux-free brazing has an outermost surface brazing filler metal layer, consisting of an Al—Si-based alloy containing 2 to 13% Si in mass %, and an intermediate brazing filler metal layer, consisting of an Al—Si—Mg-based alloy containing 4 to 13% Si and 0.1 to 5.0% Mg in mass %, which are cladded on one or both sides of a core material. In the outermost surface brazing filler metal layer, the number of Si particles having a circle equivalent diameter of 1.75 μm or more is 10% or more of the number having a circle equivalent diameter of 0.8 μm or more, as observed in the direction of the surface layer. The intermediate brazing filler metal layer contains less than 3000 per 10000 μm² of Si particles having a circle equivalent diameter of 0.25 μm or more, as observed in a cross section of the brazing filler metal layer.

13 Claims, 3 Drawing Sheets

(51) Int. Cl.
  *B23K 1/00*   (2006.01)
  *B23K 35/28*  (2006.01)
  *C22C 21/02*  (2006.01)
  *B23K 103/10* (2006.01)
  *B23K 101/14* (2006.01)

(52) U.S. Cl.
  CPC ............ *B32B 15/016* (2013.01); *C22C 21/02* (2013.01); *B23K 2101/14* (2018.08); *B23K 2103/10* (2018.08); *F28F 2275/045* (2013.01); *Y10T 428/12764* (2015.01)

(56) References Cited

U.S. PATENT DOCUMENTS

| 2015/0165564 A1 | 6/2015  | Ahl et al. |
| 2016/0305037 A1 | 10/2016 | Tateno |
| 2018/0305836 A1 | 10/2018 | Tateno |

FOREIGN PATENT DOCUMENTS

| CN | 106042525   | A  |   | 10/2016 |
| JP | 4547032     | B1 |   | 9/2010  |
| JP | 2014037576  | A  |   | 2/2014  |
| JP | 2014155955  |    | * | 8/2014  |
| JP | 2014155955  | A  |   | 8/2014  |
| JP | 2015528852  | A  |   | 10/2015 |
| JP | 6055573     | B1 |   | 12/2016 |
| WO | 2010000666  | A1 |   | 1/2010  |
| WO | 2013180630  | A1 |   | 12/2013 |

OTHER PUBLICATIONS

International Preliminary Report on Patentability (IPRP) dated Jul. 11, 2019, and English-language translation of a Written Opinion issued in International Application No. PCT/JP2017/036921.

Chinese Office Action (and English language translation thereof) dated Nov. 4, 2020 issued in Chinese Application No. 201780077199.X.

International Search Report dated Jan. 9, 2018 (and English translation thereof) issued in International Application No. PCT/JP2017/036921.

Written Opinion of the International Searching Authority dated Jan. 9, 2018 issued in International Application No. PCT/JP2017/036921.

* cited by examiner

(a) Brazing evaluation model (b) Position of evaluation of the joining part width

BRAZING SHEET FOR FLUX-FREE BRAZING, METHOD FOR FLUX-FREE BRAZING AND METHOD FOR MANUFACTURING HEAT EXCHANGER

TECHNICAL FIELD

This invention relates to a brazing sheet for flux-free brazing used for brazing aluminum alloy members in a manner of flux-free, a method for flux-free brazing and a method for manufacturing a heat exchanger.

BACKGROUND ART

In the field of brazing, including automobile heat exchangers, the flux-free method using Al—Si—Mg alloy brazing filler metal is proposed. With flux-free brazing using Al—Si—Mg alloy brazing filler metals, the Mg in the melt-activated brazing filler metal deoxidizes and decomposes the Al oxide film ($Al_2O_3$) on the joining part surface, thereby making joining possible. With occlusive face joining joints, due to the decomposition of the oxide film by Mg, a good joining state is obtained by a joint as a combination of brazing sheets having a brazing filler metal, or with a joint as a combination of joined members (bare materials) which do not have a brazing sheet or brazing filler metal.

However, with a joint shape having an open part that is easily affected by the atmosphere, the MgO film grows more easily on the surface of the Mg-added brazing filler metal, but the MgO film being a stable oxide film hard to decompose, the joining is significantly inhibited. For this reason, a method for flux-free brazing obtaining a stable joining state by a joint having an open part is strongly desired.

Regarding the above problem, a technique is proposed, wherein the joining state is improved by making the outermost surface layer to be a Mg-free alloy, and by applying the brazing filler metal with Mg on the intermediate layer in order to suppress the growth of the MgO film on the surface of the brazing filler metal (see Patent Literature 1).

CITATION LIST

Patent Literature

[Patent Literature 1] Japanese Patent Laid-Open No. 2014-155955

SUMMARY OF INVENTION

Technical Problem

However, with the technique proposed in the Patent Literature 1, a liquid phase brazing filler metal is generated more rapidly than the outermost surface layer during the brazing heating process, since the intermediate layer has a lower solidus temperature than the outermost surface layer due to the addition of Mg, and also, as the added amount of Si increases, the amount of liquid phase (ratio of liquid phase) increases. There is a problem that the intermediate layer brazing filler metal, that started to melt before the outermost surface layer melts, flows out from the material end and the like and stops functioning as an effective fluid brazing filler metal flowing in the joining part. Furthermore, when it is applied to a practical joint shape such as a corrugated fin, there is also a problem that sufficient joining cannot always be obtained.

The inventor has overcome the above problem by focusing on the formation behavior of liquid phase brazing filler metal on the intermediate layer and outermost surface layer during the brazing heating process and optimizing the Si particle distribution in the intermediate layer brazing filler metal before brazing, and furthermore, by focusing on the state of the oxide film on the joining part surface and optimizing the Si particle distribution of the outermost surface brazing filler metal.

Solution to Problem

That is, in a first aspect of the brazing sheets for flux-free brazing of the present invention, A brazing sheet for flux-free brazing, comprising: an outermost surface brazing filler metal layer, consisting of an Al—Si-based alloy comprising 2 to 13% Si in mass %, and an intermediate brazing filler metal layer consisting of an Al—Si—Mg-based alloy containing 4 to 13% Si and 0.1 to 5.0% Mg in mass %, the outermost surface brazing filler metal layer and the intermediate brazing filler metal layer are cladded on one side or both sides of a core material, and furthermore, and furthermore, in the outermost surface brazing filler metal layer, the number of Si particles having a circle equivalent diameter of 1.75 μm or more among 10% or more of the number of those having a circle equivalent diameter of 0.8 μm or more, as observed in the direction of the surface layer, and the intermediate brazing filler metal layer contains less than 3000 per 10000 μm² of Si particles having a circle equivalent diameter of 0.25 μm or more, as observed in a cross section of the brazing filler metal layer.

In another aspect of the brazing sheets for flux-free brazing according to the preceding aspect of the present invention, the outermost surface brazing filler metal consists of an Al—Si-based alloy containing Si of 2% or more and less than 4% in mass %.

In another aspect of the brazing sheets for flux-free brazing according to any preceding aspect of the present invention, the outermost surface brazing filler metal consists of an Al—Si-based alloy containing 0.1 to 1.0% Fe in mass %.

In another aspect of the brazing sheets for flux-free brazing according to any preceding aspect of the present invention, the liquidus temperature difference between the outermost surface brazing filler metal layer and the intermediate brazing filler metal layer is less than 50° C.

In another aspect of the brazing sheets for flux-free brazing according to any preceding aspect of the present invention, the cladding ratios of the outermost surface brazing filler metal layer and the intermediate brazing filler metal layer in the present invention of the above aspects are 1 to 30% per each side relative to the overall thickness of the brazing sheet respectively.

In another aspect of the brazing sheets for flux-free brazing according to any preceding aspect of the present invention, 0.01 to 0.5% Bi in mass % is further contained in the brazing filler metal of the intermediate brazing filler metal layer.

In another aspect of the brazing sheets for flux-free brazing according to any preceding aspect of the present invention, 0.01 to 0.5% Bi in mass % is further contained in the brazing filler metal of the outermost surface brazing filler metal layer.

In the method for flux-free brazing of aluminum members of the present invention, the aluminum members are joined to each other without using flux in a non-oxidizing gas atmosphere with an oxygen concentration of 100 ppm or less, using the brazing sheet for flux-free brazing of the above aspects.

In the method for manufacturing a heat exchanger according to the present invention, the aluminum members are joined to each other without using flux in a non-oxidizing gas atmosphere with an oxygen concentration of 100 ppm or less, using the brazing sheet for flux-free brazing of the above aspects.

Next is a description of the content provided in the claimed invention. The contents in the description of the components are all indicated in mass %.

Brazing Filler Metal Composition of the Outermost Surface Brazing Filler Metal Layer
Si: 2 to 13%

On the outermost surface brazing filler metal layer, a molten brazing filler metal is formed by Si at the time of brazing and a fillet of the joining part is formed. When the Si content is insufficient, the molten brazing filler metal for forming the fillet is insufficient. Moreover, the diffusion of Mg from the intermediate layer is delayed, and sufficient joining cannot be obtained. On the other hand, when the Si content becomes excessive, the effect becomes saturated. Moreover, since the material becomes hard and brittle, production of the material becomes difficult.

Therefore, the Si content in the brazing filler metal of the outermost surface brazing filler metal layer is 2 to 13%. Moreover, for similar reasons, it is further desirable that the lower limit of the Si content is set to 3%, and the upper limit of the Si content is set to 11%.

Furthermore, in a large-sized product or a heat exchanger with a complicated internal structure, the brazing filler metal flow may become uneven due to temperature variation in the product during brazing, but as for a joining member that is thin in the thickness and tends to have a high arrival temperature, in order to suppress the flowing of the brazing filler metal, it is effective to secure the amount of brazing filler metal necessary for fillet formation by the amount of Si in the intermediate layer brazing filler metal and to reduce the amount of Si in the outermost surface brazing filler metal. In this case, the amount of Si in the outermost surface brazing filler metal is set to 2% or more and less than 4%. If it is less than 2%, the outermost surface layer brazing filler metal is not sufficiently melted, and the diffusion of Mg from the intermediate layer brazing filler metal tends to be delayed, and a joining tends to deteriorated, and if it is 4% or more, the effect of suppressing the brazing filler metal flow is insufficient.
Bi: 0.05 to 0.5%

Bi is contained if desired, since it concentrates on the material surface during the brazing heating process, and suppresses the growth of a dense oxide film. When the content of Bi is insufficient, the effect is insufficient, and when Bi is contained in excess, the effect becomes saturated. Therefore, it is desirable that the content of Bi is set to be 0.05 to 0.5%. Moreover, for similar reasons, it is further desirable that the lower limit of Bi is set to be 0.1%, and the upper limit of Bi is set to be 0.2%.
Fe: 0.1 to 1.0%

Fe hardly dissolves in Al and is present as a single substance or an intermetallic compound with Al, Mn, Si, etc. in the outermost surface brazing filler metal. Since these particles present on the surface of the material become defects in the oxide film on the surface of the joining part, therefore it has the effect of suppressing the growth of the oxide film that inhibits the joining, and of making the oxide film easily broken when the Mg that has diffused from the intermediate layer brazing filler metal decomposes $Al_2O_3$. If it is less than 0.1%, the effect is insufficient, if it is 1.0% or more, the effect saturates, and if the amount is further increased, the brazing filler metal layer becomes mechanically brittle and the rollability decreases, therefore the lower limit is set to be 0.1% and the upper limit is set to be 1.0%.
Brazing Filler Metal Composition of the Intermediate Brazing Filler Metal Layer
Si: 4 to 13%

Si generates a liquid phase in the intermediate layer at the time of brazing, and promotes the diffusion of the Mg added to the intermediate layer to the outermost surface layer. When the Si content is insufficient, the effect is insufficient, and when Si is contained in excess, a sufficient joining state cannot be obtained since an excessive liquid phase flows out from the material end and the like and the Mg in the intermediate layer is consumed.

Therefore, it is desirable that the Si content is set to be 4 to 13%.

For similar reasons, it is further desirable that the lower limit of the Si content is set to be 5%, and the upper limit of the Si content is set to be 11%.
Mg: 0.1 to 5.0%

Mg deoxidizes and decomposes the Al oxide film ($Al_2O_3$). However, when the Mg content is insufficient, the effect is insufficient, and when the Mg content is excessive, the effect becomes saturated and the material becomes hard and brittle, therefore the production of materials becomes difficult. Therefore, the Mg content is set to be 0.1 to 5.0%. For similar reasons, it is desirable that the lower limit is set to be 0.3% and the upper limit is set to be 3.0%, and it is more desirable that the lower limit is set to be 0.8% and the upper limit is set to be 2.5%.
Bi: 0.01 to 0.5%

Bi is contained if desired, since it concentrates on the material surface during the brazing heating process, and suppresses the growth of a dense oxide film. When the Bi content is insufficient, the effect is insufficient, and when the Bi content is excessive, the effect becomes saturated. Therefore, it is desirable that the Bi content is set to be 0.01 to 0.5%. For similar reasons, it is desirable that the lower limit is set to be 0.02%, and the upper limit is set to be 0.2%.
Liquidus Temperature of the Brazing Filler Metal Since the intermediate layer brazing filler metal has a solidus temperature lower than that of the Al—Si brazing filler metal on the outermost surface due to the adding of Mg, it starts melting earlier than the outermost surface brazing filler metal in the brazing heating process, and as it approaches the liquidus temperature, the liquid phase ratio increases, and the diffusion amount of Mg to the outermost surface brazing filler metal is increased. However, if the liquidus temperature of the intermediate layer brazing filler metal is too much lower than that of the outermost surface brazing filler metal, the intermediate layer brazing filler metal will flow out from the material end etc. and there will not be an enough amount of Mg to decompose the $Al_2O_3$ film on the material surface, or the amount of effective flowing fluid brazing filler metal flowing into the joining part will be insufficient. Also, conversely, if the liquidus temperature of the outermost surface brazing filler metal is too much lower than that of the liquidus temperature of the intermediate layer brazing filler metal, the liquid phase ratio of the outermost surface brazing filler metal increases and becomes active before an amount of Mg sufficient to decompose the $Al_2O_3$ film on the surface of the outermost surface brazing filler metal diffuses from the intermediate layer brazing filler metal, thereby the brazability is decreased due to re-oxidation of the outermost surface and unstable flowing of the brazing filler metal. Therefore, it is desirable that the liquidus temperature difference between the intermediate layer brazing filler metal and the outermost surface brazing filler metal is set to be less than 50° C. Furthermore, for similar reasons, it is more desirable that it is set to be less than 35° C.

Cladding Ratio of the Brazing Filler Metal:1 to 30%

It is desirable that the cladding ratios of the outermost surface brazing filler metal layer and the intermediate brazing filler metal layer are set to be 1 to 30% per each side relative to the overall thickness of the brazing sheet respectively. The problem is that, when the cladding ratio is too small, the longitudinal cladding ratio varies easily when clad lamination is performed by hot rolling, and when the cladding ratio is too large, the joining state of the clad interface becomes unstable when clad lamination, and a sufficient production quality cannot be ensured. Moreover, it is desirable to ensure that the cladding ratio of the core material is 50% or more, in order to ensure the structural strength and dimensional accuracy of the products after brazing.

Also, when implementing the present invention, it is preferable that relatively coarse Si particles are present on the brazing filler metal surface of the outermost surface layer. Normally, a dense oxide film such as $Al_2O_3$ is present on the surface of the aluminum material, and this further grows and becomes a thick film during the process of brazing heat treatment. The general view is that the more the thickness of the oxide film increases, the tendency to block the destructive effect of the oxide film becomes stronger. In the present invention, by having coarse Si particles present on the brazing filler metal surface of the outermost surface layer, the dense oxide film of aluminum does not grow on the coarse Si particle surface and this part works as a defect in the oxide film on the surface of the aluminum material. Namely, it is considered that, even if the oxide film on the surface of the aluminum material becomes a thick film during the brazing heat treatment, oozing and the like of the brazing filler metal from the Si particle part occurs and the destructive effect of the oxide film progresses starting from this part. Here, the Si particle refers to a Si particle consist of Si single substance component in terms of composition, or also includes, for example, Fe—Si-based compounds and Al—Fe—Si-based intermetallic compounds having Fe—Si as the main component, and the like. In the description of the present invention, these are conveniently written as Si particles. Specifically, if considering the Si particles on the brazing filler metal surface by their circle equivalent diameter and counting the number of Si particles of 0.8 µm or more, this effect can be obtained sufficiently when the ratio of the number of those of 1.75 µm or more is 10% or more. The density of the Si particles is not mentioned in the present invention, but since the number of Si particles of 0.8 µm or more in a visual field of 10000 µm$^2$ is thought to range from dozens to thousands according to the alloy composition and the production condition range, and the finishing plate thickness of the material used in the present invention, and the prescription thereof is difficult, therefore, in the present invention, the above prescription has been defined as desirable after confirming that the effect is obtained if, within this range of Si particle number, the ratio of the number of those of 1.75 µm or more is 10% or more.

Also, when implementing the present invention, it is preferable of the state that the Si particles in the brazing filler metal of the intermediate layer are finely dispersed. In the present invention, when the brazing filler metal of the intermediate layer in which Mg was added reaches the solidus temperature during the brazing heating process, melting starts from the $Mg_2Si$ particles etc., and the diffusion of Mg to the outermost surface brazing filler metal layer progresses more easily, but when the Si particles in the brazing filler metal of the intermediate layer are coarse and roughly distributed, the diffusion of Mg to the outermost surface brazing filler metal layer becomes uneven, thereby making the decomposition of the oxide film ($Al_2O_3$ etc.) by the Mg on the surface of the outermost surface brazing filler metal layer also uneven, and the joining state becomes unstable. Here, the Si particle refers to a Si particle consist of Si single substance component in terms of composition, or also includes, for example, intermetallic compounds such as $Mg_2Si$ compounds. In the description of the present invention, these are conveniently written as Si particles. Specifically, the effect is obtained by having less than 3000 Si particles of 0.25 µm or more per 10000 µm$^2$, when considering the Si particles observed in the cross-section of the brazing filler metal of the intermediate layer by their circle equivalent diameter. It is desirable that the particle diameter of the Si particles is more finely and densely dispersed within the range satisfying the above.

Examples of means to make the Si particles fine include applying ultrasonic waves or controlling the solidifying speed (0.1 to 500° C./sec) during the casting, adjusting by the temperature conditions during the annealing, and adding Sr and the like which has a refining effect on the Si particles in the brazing filler metal, but the methods thereof are not limited.

Non-Oxidizing Gas Atmosphere with an Oxygen Concentration of 100 ppm or Less

With the above brazing sheet, brazing can be performed flux-free in a non-oxidizing gas atmosphere with an oxygen concentration of 100 ppm or less.

The pressure of the atmosphere inside the brazing furnace is basically the normal pressure, but it can be, for example, a medium to low vacuum of about 100 kPa to 0.1 Pa in the temperature range before the melting of the brazing filler metal in order to improve the gas replacement efficiency inside the product, or a positive pressure of about 5 to 100 Pa more than the atmospheric pressure in order to prevent the inclusion of outside air (atmospheric air) to the furnace.

Examples of non-oxidizing gas atmosphere include nitrogen gas or reducing gas, or a mixed gas thereof. The types of replacement gas to be used are not particularly limited for achieving the joining of aluminum materials, but from a viewpoint of cost, it is preferable to use nitrogen gas, use argon as an inert gas and use hydrogen or ammonia as reducing gas. 100 ppm or less is desirable as a controlled range of the oxygen concentration in the atmosphere. Above 100 ppm, the reoxidation of the member to be brazed progresses more easily. For similar reasons, it is desirable that it is 30 ppm or less, and further desirable that it is 10 ppm or less.

Advantageous Effects of Invention

Namely, according to the present invention, use of a brazing filler metal which is not added with Mg, as the outermost surface and use of a brazing filler metal which is added with Mg as the intermediate layer can suppress the growth of MgO film on the material surface during the brazing heating process, while optimizing the Si particle distribution in each of the brazing filler metal layers, thereby efficiently delivering Mg, which decomposes Al oxide film ($Al_2O_3$), to the material surface during the melting of the brazing filler metal, therefore allowing the molten brazing filler metal to wetly spread more easily on the joining part surface and also to provide a good joining state on a joint having an open part.

The present invention allows to obtain a good joining state on joints having an open part under the control of a practical oxygen concentration, thereby ensuring strength and durability of the joining part equivalent to or greater than the conventional brazing method in outer fins and tube root parts of radiators, condensers, evaporators, heater cores, intercoolers and the like.

Moreover, in this embodiment, an automobile heat exchanger was described as an application use of the present invention, but it may be a heat exchanger other than for automobiles, and furthermore the uses for the present invention are not limited to a heat exchanger.

DESCRIPTION OF EMBODIMENT

The following describes one embodiment of the present invention on the basis of the attached drawings.

Among of the aluminum alloys for the brazing filler metal, the aluminum alloys for the brazing filler metal using for the outermost surface layer is prepared into a composition containing, in mass %, Si: 2 to 13%, and containing, if desired, Fe: 0.1 to 1.0%, Bi: 0.01 to 0.5%, and with Al and inevitable impurities as the residual, and the aluminum alloys for the brazing filler metal using for the intermediate layer is prepared into a composition containing, in mass %, Si: 4 to 13% and Mg: 0.1 to 5.0%, and containing, if desired, Bi: 0.01 to 0.5%, and with Al and inevitable impurities as the residual. Moreover, as aluminum alloys for the brazing filler metal, others such as Cu: 0.05 to 2.0, Mn: 0.05 to 2.5, Ca: 0.001 to 0.5, Li: 0.001 to 0.5, and Be: 0.001 to 0.1 and the like in mass % can be contained.

Moreover, the aluminum alloy for the core material is prepared into a composition containing, in mass %, Mn: 0.1 to 3.0%, Si: 0.1 to 1.2%, Cu: 0.1 to 3.0%, and with Al and inevitable impurities as the residual. Moreover, as the aluminum alloy for the core material, others such as Fe, Mg and Bi and the like can be contained in known amounts.

For the present invention, the composition of the aluminum alloy for the core material is not particularly limited, but alloys with positively added Mg and Si can be used preferably since they can achieve a significantly high strength of the material by finely precipitating $Mg_2Si$ etc. With the conventional brazing method using a fluoride-based flux, since the flux becomes inactive by reacting with Mg and generating fluoride Mg of high melting point, therefore the brazability was decreased, and it was difficult to apply it into high strength Mg added alloys since Mg is consumed by this reaction, but with flux-free brazing, it is possible to utilize high strength Mg added alloys.

An aluminum alloy added with Zn can be cladded as a sacrificial anticorrosion layer between any clad layers, or on the core material surface on which the brazing filler metal is not cladded.

A clad material joined by performing hot rolling and cold rolling on these alloys and superposing the intermediate brazing filler metal layer and the outermost surface brazing filler metal layer on one side or both sides of the core material, is obtained.

Figure 1:
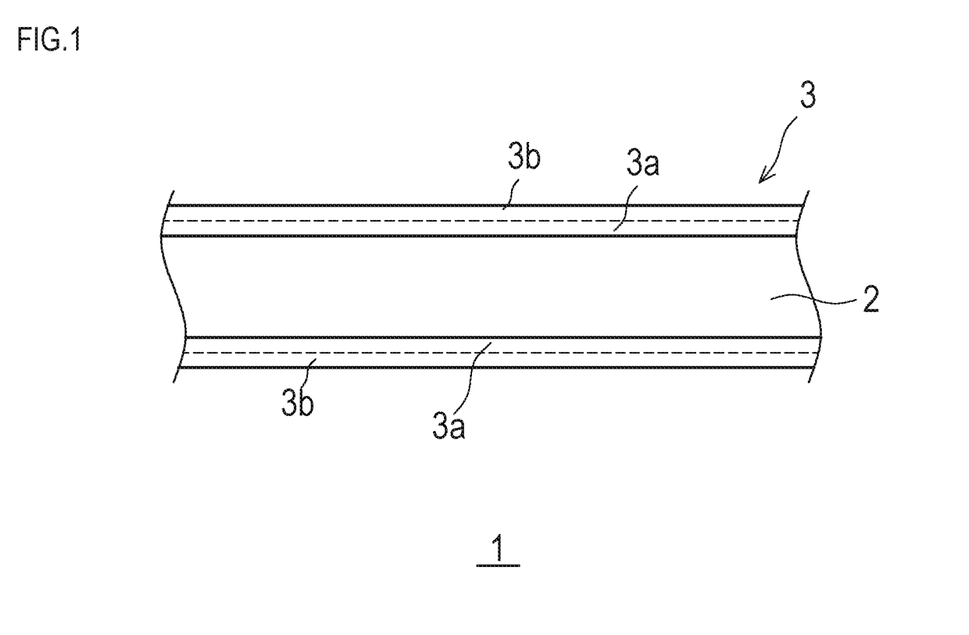
FIG. 1 shows a brazing sheet for flux-free brazing in one embodiment of the present invention.

Going through the above process allows to obtain a brazing sheet 1 for a heat exchanger on which an aluminum alloy brazing filler metal 3 is cladded on both sides of an aluminum alloy core material 2, as shown in FIG. 1. The aluminum alloy core material 2 corresponds to the aluminum alloy member of the present invention. The aluminum alloy brazing filler metal 3 consists of an intermediate brazing filler metal layer 3a and an outermost surface brazing filler metal layer 3b.

Each intermediate brazing filler metal layer 3a and outermost surface brazing filler metal layer 3b have a thickness of 1 to 30% to the total thickness of the brazing sheet 1.

The brazing sheet 1 can be used as the tube, header, tank, outer fin or inner fin and the like of the heat exchanger.

On the other hand, as the object member to be brazed, an aluminum alloy containing, for example, in mass %, Mg: 0.1 to 0.8%, containing Si: 0.1 to 1.2%, and with Al and inevitable impurities as the residual can be prepared and processed into an appropriate shape. The object member to be brazed corresponds to the aluminum member of the present invention. The composition of the object member to be brazed is not particularly limited in the present invention and the member with the appropriate composition can be used.

It is desirable that the brazing sheet 1 is adjusted so that the above-described outermost surface brazing filler metal layer 3b is located on the outermost surface, the average film thickness of the surface oxide film is 15 nm or less, and the average film thickness of the MgO film in the surface oxide film is 2 nm or less.

Moreover, it is desirable that the object member to be brazed is adjusted so that, at least on the joining face, the average film thickness of the surface oxide film is 15 nm or less and the thickness of the MgO film inside the film is 2 nm or less.

The above-described surface oxide film can be adjusted by temperature and time for various heat treatments such as homogenization after the casting, soaking heating before hot rolling and annealing after cold rolling.

The brazing sheet 1 and the object member to be brazed are arranged so that the intermediate brazing filler metal layer 3a and the outermost surface brazing filler metal layer 3b are interposed flux-free between the aluminum alloy core material 2 and the object member to be brazed. These are assembled to form an assembly of aluminum alloys for brazing. Therefore, the brazing sheet 1 corresponds to the brazing sheet for flux-free brazing of the present invention.

The above-described assembly is arranged in a heating furnace with a non-oxidizing atmosphere under normal pressure. The non-oxidizing gas can be composed by using nitrogen gas, or inert gas such as argon, or reducing gas such as hydrogen and ammonia, or a mixed gas thereof. The pressure of the atmosphere inside the brazing furnace is basically the normal pressure, but it can be, for example, a medium to low vacuum of about 100 kPa to 0.1 Pa in the temperature range before the melting of the brazing filler metal in order to improve the gas replacement efficiency inside the product, or a positive pressure of about 5 to 100 Pa more than the atmospheric pressure in order to suppress the inclusion of outside air (atmospheric air) to the furnace. The heating furnace does not need to have a closed space, and can be a tunnel type having a carrying-in port and a carrying-out port of brazing filler metals. Even in such a heating furnace, the non-oxidizing property is maintained by continuously blowing off an inert gas to the furnace. As the non-oxidizing atmosphere, an oxygen concentration of 100 ppm or less in volume ratio is desirable.

Under the above atmosphere, brazing and joining are performed, for example, under the heat treatment conditions that heating at a temperature rising speed of 10 to 200° C./min and the arrival temperature of the assembly becomes 580 to 620° C.

In the brazing conditions, the brazability is improved by suppressing the growth of the oxide film on the material surface, since the faster the temperature rising speed is, the shorter the brazing time is. Brazing is possible if the arrival temperature is at least equal to or higher than the solidus temperature of the brazing filler metal, but the fluid brazing filler metal increases by getting close to the liquidus temperature, and a good joining state is more easily obtained with a joint having an open part. However, when the temperature is too high, brazing erosion progresses more easily and the structural dimensional accuracy of the assembly after brazing decreases, and so it is not preferable.

Figure 2:
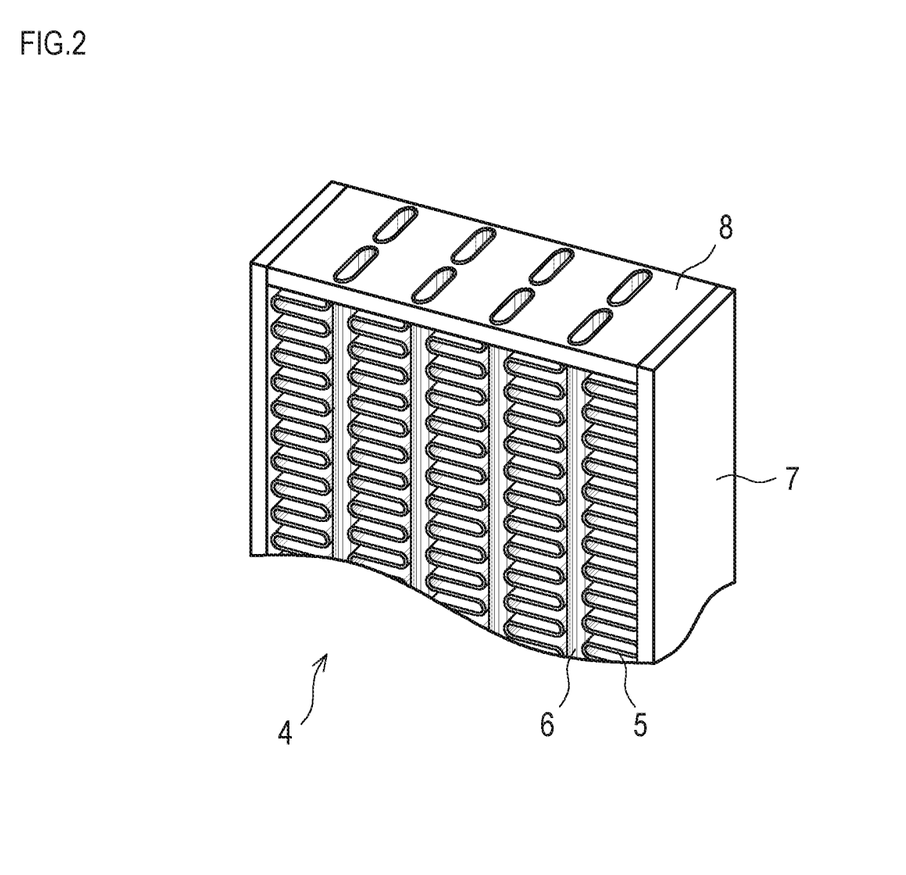
FIG. 2 shows a perspective view of an aluminum-made automobile heat exchanger in one embodiment of the present invention.

FIG. 2 shows an aluminum-made automobile heat exchanger 4 forming a fin 5 by using the above-described brazing sheet 1, and using an aluminum alloy-made tube 6 as the object member to be brazed. The aluminum-made automobile heat exchanger 4 is obtained by incorporating the fin 5 and the tube 6 to a reinforcement material 7 and a header plate 8 and flux-free brazing.

Example 1

An aluminum material cladded with the brazing filler metals of the composition (as the residual, Al and the inevitable impurities) shown in Table 1 and Table 2 and a core material of JIS A3003 were prepared.

For the aluminum clad materials, the brazing filler metals of the various compositions were set to a cladding ratio of 5% and finished so as to have a 0.25 mm thickness of a temper equivalent to H14. Moreover, as the object member to be brazed, a corrugate fin 11 of JISA3005 alloy and H14 aluminum bare material (0.1 mm thick) was prepared.

TABLE 1

Composition of the outermost surface layer brazing filler metal (mass %)

| No. | Si | Mg | Fe | Bi | Other | Estimated liquidus |
|---|---|---|---|---|---|---|
| 1 | 2 | — | — | — | — | 648° C. |
| 2 | 3 | — | — | — | — | 642° C. |
| 3 | 5 | — | — | — | — | 628° C. |
| 4 | 7 | — | — | — | — | 613° C. |
| 5 | 9 | — | — | — | — | 598° C. |
| 6 | 11 | — | — | — | — | 583° C. |
| 7 | 2 | — | 0.7 | — | — | 648° C. |
| 8 | 5 | — | 0.4 | — | — | 628° C. |
| 9 | 11 | — | 0.2 | — | — | 583° C. |
| 10 | 5 | — | — | 0.02 | — | 628° C. |
| 11 | 7 | — | — | 0.02 | — | 613° C. |
| 12 | 11 | — | — | 0.02 | — | 583° C. |
| 13 | 5 | — | — | 0.1 | — | 628° C. |
| 14 | 7 | — | — | 0.1 | — | 613° C. |
| 15 | 11 | — | — | 0.1 | — | 583° C. |
| 16 | 5 | — | — | 0.3 | — | 628° C. |
| 17 | 7 | — | — | 0.3 | — | 613° C. |
| 18 | 11 | — | — | 0.3 | — | 583° C. |
| 19 | 11 | — | 0.2 | 0.1 | — | 583° C. |
| 20 | 11 | — | 0.7 | 0.02 | — | 583° C. |

TABLE 1-continued

Composition of the outermost surface layer brazing filler metal (mass %)

| No. | Si | Mg | Fe | Bi | Other | Estimated liquidus |
|---|---|---|---|---|---|---|
| 21 | 7 | — | — | — | Cu: 0.5 | 612° C. |
| 22 | 7 | — | — | — | Mn: 1.0 | 613° C. |
| 23 | 7 | — | — | — | Ca: 0.05 | 613° C. |
| 24 | 7 | — | — | — | Li: 0.05 | 613° C. |
| 25 | 7 | — | — | — | Be: 0.01 | 613° C. |
| 26 | 9 | 1.0 | — | — | — | 594° C. |
| 27 | 9 | 1.5 | 0.1 | 0.1 | — | 593° C. |

TABLE 2

Composition of the intermediate layer brazing filler metal (mass %)

| No. | Si | Mg | Bi | Other | Estimated liquidus |
|---|---|---|---|---|---|
| 1 | 4 | 0.5 | — | — | 631° C. |
| 2 | 8 | 0.5 | — | — | 602° C. |
| 3 | 11 | 0.5 | — | — | 581° C. |
| 4 | 4 | 1.0 | — | — | 629° C. |
| 5 | 8 | 1.0 | — | — | 601° C. |
| 6 | 11 | 1.0 | — | — | 580° C. |
| 7 | 4 | 1.5 | — | — | 628° C. |
| 8 | 8 | 1.5 | — | — | 600° C. |
| 9 | 11 | 1.5 | — | — | 579° C. |
| 10 | 4 | 2.5 | — | — | 624° C. |
| 11 | 8 | 2.5 | — | — | 598° C. |
| 12 | 11 | 2.5 | — | — | 577° C. |
| 13 | 4 | 4.0 | — | — | 618° C. |
| 14 | 8 | 4.0 | — | — | 594° C. |
| 15 | 11 | 4.0 | — | — | 573° C. |
| 16 | 4 | 1.5 | 0.02 | — | 628° C. |
| 17 | 8 | 1.5 | 0.02 | — | 600° C. |
| 18 | 11 | 1.5 | 0.02 | — | 579° C. |
| 19 | 4 | 1.5 | 0.1 | — | 628° C. |
| 20 | 8 | 1.5 | 0.1 | — | 600° C. |
| 21 | 11 | 1.5 | 0.1 | — | 579° C. |
| 22 | 4 | 1.5 | 0.3 | — | 628° C. |
| 23 | 8 | 1.5 | 0.3 | — | 600° C. |
| 24 | 11 | 1.5 | 0.3 | — | 579° C. |
| 25 | 8 | 1.5 | — | Cu: 0.5 | 598° C. |
| 26 | 8 | 1.5 | — | Mn: 1.0 | 600° C. |
| 27 | 8 | 1.5 | — | Ca: 0.05 | 600° C. |
| 28 | 8 | 1.5 | — | Li: 0.05 | 600° C. |
| 29 | 8 | 1.5 | — | Be: 0.01 | 600° C. |
| 30 | 8 | — | — | — | 606° C. |
| 31 | 8 | — | 0.1 | — | 606° C. |

A 20 mm wide tube 12 was produced using the aluminum clad material, the tube 12 and the corrugate fin 11 were combined, and a core 10 having 15-steps tube and length of 300 mm as shown in FIG. 3(a) were made as the brazing evaluation model. The core was heated to 600° C. in a brazing furnace in a nitrogen atmosphere (oxygen content of 50 ppm), and the brazing state was evaluated.

Brazability

Joining Rate

The joining rate was calculated with the following formula, and the superiority/inferiority of each sample was evaluated.

Fin joining rate=(total brazing length of the fin and the tube/total contact length of the fin and the tube)×100

The evaluation was made according to the following criteria and the results are shown in Table 3 and 4. As for fin joining rate after brazing, Excellent: 98% or more, Good:

90% or more and less than 98%, Fair: 80% or more and less than 90%, Poor: less than 80%

Evaluation of the Joining Part Width

Figure 3:
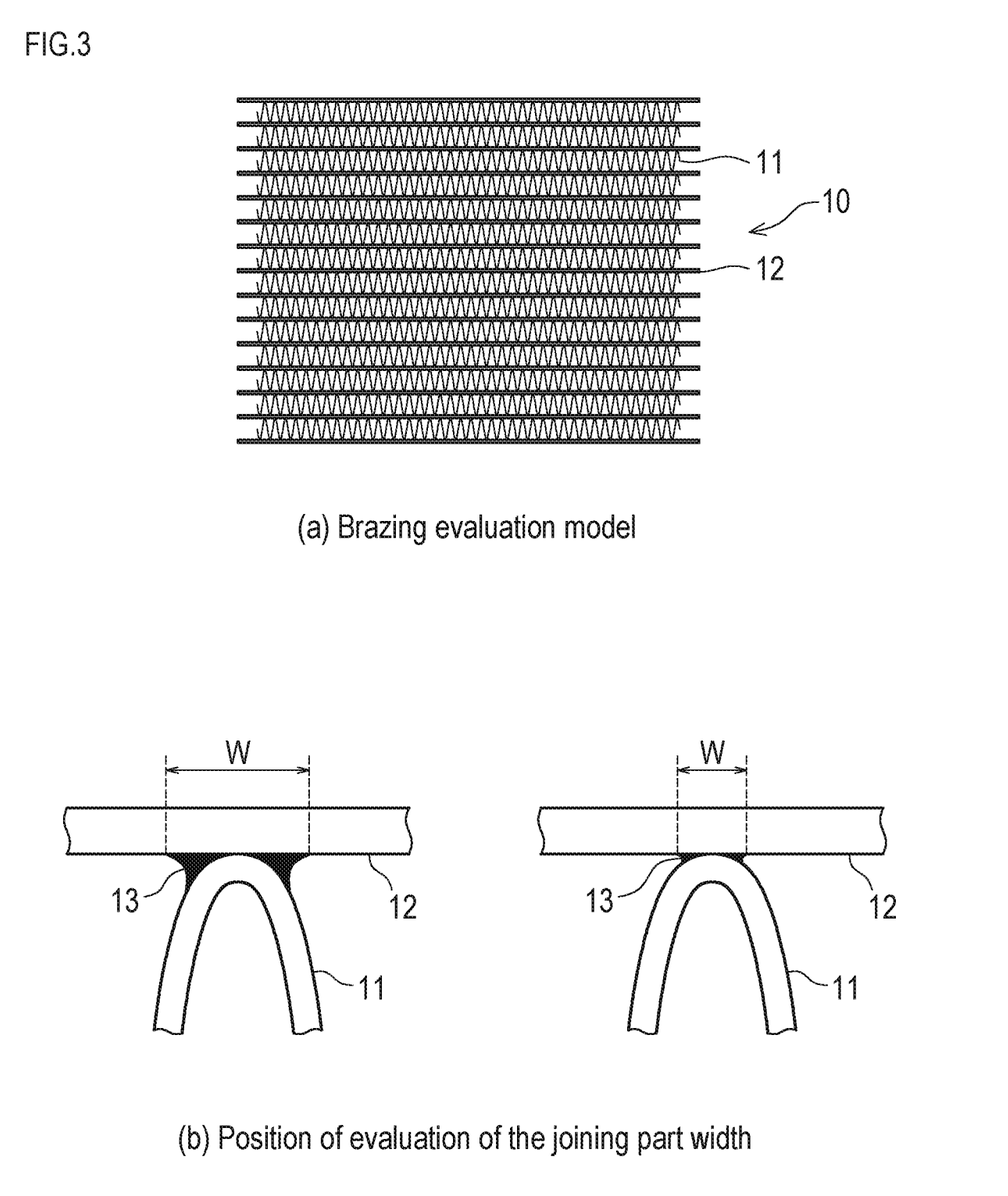
FIG. 3(a) shows a brazing evaluation model in examples of the present invention.
FIG. 3(b) shows widths of a joining part in the evaluation model.

Since the brazing joining state is to confirm not only the above joining rate, but also the improvement of the fillet forming capacity that is the purpose of the present invention, therefore the width W of the joining part 13 as shown in FIG. 3(*b*) was measured on 20 points in each sample, and the superiority/inferiority was evaluated based on its average value. The evaluation was made according to the following criteria and shown in Table 3 and 4.

Excellent: 0.8 mm or more, Good: 0.7 mm or more and less than 0.8 mm, Fair: 0.6 mm or more and less than 0.7 mm, Poor: less than 0.6 mm Si Particle Ratio in the Outermost Surface Brazing Filler Metal Layer The surface of the prepared clad materials was mirror-polished by 0.1 μm abrasive grains, and fully automatic particle analysis was performed using an EPMA (electron probe microanalyzer) in an observation field of 10000 μm² (100 μm angle) in the surface direction. The ratios of particles of 1.75 μm or more to the total number of measured particles of 0.8 μm or more are shown in Tables 3 and 4.

Si Particle Number in the Intermediate Layer Brazing Filler Metal

The prepared clad materials were cut, the cut surface was mirror-polished by 0.1 μm abrasive grains, and then fully automatic particle analysis was performed using an EPMA (electron probe microanalyzer) in an observation field of 10000 μm² (10×1000 μm) in the intermediate brazing filler metal layer. The total number of measured particles of 0.25 μm or more are shown in Tables 3 and 4.

All the examples showed a good brazability, in contrast, a sufficient joining was not obtained in the comparative examples.

TABLE 3

| No. | | Brazing filler metal | | Outermost surfaces layer brazing filler metal the proportion of Si particles of 1.75 μm or more [%] | Intermediate layer brazing filler metal the number of Si particles of 0.25 μm or more [piece] | Outermost surface layer liquidus - Intermediate layer liquidus [° C.] | Brazability | Joining part width |
|---|---|---|---|---|---|---|---|---|
| | | Outermost surface layer No. | Intermediate layer No. | | | | | |
| Example | 1 | 1 | 8 | 10 | 1000 | 48 | Excellent | Fair |
| | 2 | 2 | 8 | 20 | 1000 | 42 | Excellent | Good |
| | 3 | 3 | 8 | 30 | 1000 | 28 | Excellent | Good |
| | 4 | 4 | 8 | 40 | 1000 | 13 | Excellent | Excellent |
| | 5 | 5 | 8 | 15 | 1000 | −2 | Excellent | Good |
| | 6 | 6 | 8 | 25 | 1000 | −17 | Excellent | Excellent |
| | 7 | 7 | 8 | 40 | 1000 | 48 | Excellent | Good |
| | 8 | 8 | 8 | 45 | 1000 | 28 | Excellent | Excellent |
| | 9 | 9 | 8 | 50 | 1000 | −17 | Excellent | Excellent |
| | 10 | 10 | 8 | 35 | 1000 | 28 | Excellent | Excellent |
| | 11 | 11 | 8 | 30 | 1000 | 13 | Excellent | Excellent |
| | 12 | 12 | 8 | 35 | 1000 | −17 | Excellent | Excellent |
| | 13 | 13 | 8 | 30 | 1000 | 28 | Excellent | Excellent |
| | 14 | 14 | 8 | 30 | 1000 | 13 | Excellent | Excellent |
| | 15 | 15 | 8 | 30 | 1000 | −17 | Excellent | Excellent |
| | 16 | 16 | 8 | 30 | 1000 | 28 | Excellent | Excellent |
| | 17 | 17 | 8 | 30 | 1000 | 13 | Excellent | Excellent |
| | 18 | 18 | 8 | 30 | 1000 | −17 | Excellent | Excellent |
| | 19 | 19 | 8 | 30 | 1000 | −17 | Excellent | Excellent |
| | 20 | 20 | 8 | 30 | 1000 | −17 | Excellent | Excellent |
| | 21 | 21 | 8 | 35 | 1000 | 12 | Excellent | Good |
| | 22 | 22 | 8 | 35 | 1000 | 13 | Excellent | Good |
| | 23 | 23 | 8 | 25 | 1000 | 13 | Excellent | Good |
| | 24 | 24 | 8 | 25 | 1000 | 13 | Excellent | Good |
| | 25 | 25 | 8 | 30 | 1000 | 13 | Excellent | Good |
| | 26 | 3 | 1 | 20 | 100 | −3 | Fair | Fair |
| | 27 | 3 | 2 | 20 | 200 | −26 | Fair | Fair |
| | 28 | 3 | 3 | 20 | 400 | 47 | Fair | Fair |
| | 29 | 3 | 4 | 20 | 250 | −1 | Good | Good |
| | 30 | 3 | 5 | 20 | 300 | −27 | Excellent | Good |
| | 31 | 3 | 6 | 20 | 350 | 48 | Excellent | Excellent |
| | 32 | 3 | 7 | 20 | 300 | 0 | Good | Good |
| | 33 | 3 | 9 | 20 | 800 | 49 | Excellent | Excellent |
| | 34 | 3 | 10 | 20 | 700 | 4 | Good | Good |
| | 35 | 3 | 11 | 20 | 900 | 30 | Excellent | Excellent |
| | 36 | 3 | 12 | 20 | 1000 | 51 | Excellent | Good |
| | 37 | 3 | 13 | 20 | 500 | 10 | Excellent | Excellent |
| | 38 | 3 | 14 | 20 | 600 | 34 | Excellent | Excellent |
| | 39 | 3 | 15 | 20 | 800 | 55 | Excellent | Good |
| | 40 | 3 | 16 | 20 | 500 | 0 | Excellent | Good |
| | 41 | 3 | 17 | 20 | 600 | 28 | Excellent | Excellent |
| | 42 | 3 | 18 | 20 | 700 | 49 | Excellent | Excellent |
| | 43 | 3 | 19 | 20 | 500 | 0 | Excellent | Good |
| | 44 | 3 | 20 | 20 | 600 | 28 | Excellent | Excellent |
| | 45 | 3 | 21 | 20 | 700 | 49 | Excellent | Excellent |
| | 46 | 3 | 22 | 20 | 550 | 0 | Excellent | Good |
| | 47 | 3 | 23 | 20 | 750 | 28 | Excellent | Excellent |
| | 48 | 3 | 24 | 20 | 900 | 49 | Excellent | Excellent |
| | 49 | 3 | 25 | 20 | 1300 | 30 | Excellent | Good |

TABLE 3-continued

| No. | Brazing filler metal Outermost surface layer No. | Brazing filler metal Intermediate layer No. | Outermost surfaces layer brazing filler metal the proportion of Si particles of 1.75 μm or more [%] | Intermediate layer brazing filler metal the number of Si particles of 0.25 μm or more [piece] | Outermost surface layer liquidus - Intermediate layer liquidus [° C.] | Brazability | Joining part width |
|---|---|---|---|---|---|---|---|
| 50 | 3 | 26 | 20 | 1300 | 28 | Excellent | Good |
| 51 | 3 | 27 | 20 | 1000 | 28 | Excellent | Good |
| 52 | 3 | 28 | 20 | 1000 | 28 | Excellent | Good |
| 53 | 3 | 29 | 20 | 1000 | 28 | Excellent | Good |
| 54 | 11 | 1 | 35 | 100 | −18 | Good | Good |
| 55 | 11 | 5 | 35 | 300 | 12 | Excellent | Excellent |
| 56 | 11 | 13 | 35 | 500 | −5 | Excellent | Good |
| 57 | 11 | 17 | 35 | 600 | 13 | Excellent | Excellent |
| 58 | 11 | 20 | 35 | 600 | 13 | Excellent | Excellent |
| 59 | 11 | 23 | 35 | 750 | 13 | Excellent | Excellent |
| 60 | 7 | 9 | 35 | 800 | 69 | Excellent | Fair |

TABLE 4

| | No. | Brazing filler metal Outermost surface layer No. | Brazing filler metal Intermediate layer No. | Outermost surfaces layer brazing filler metal the proportion of Si particles of 1.75 μm or more [%] | Intermediate layer brazing filler metal the number of Si particles of 0.25 μm or more [piece] | Outermost surface layer liquidus - Intermediate layer liquidus [° C.] | Brazability | Joining part width |
|---|---|---|---|---|---|---|---|---|
| Comperative example | 1 | 26 | 8 | 40 | 1000 | −6 | Poor | Poor |
| | 2 | 27 | 8 | 45 | 1000 | −7 | Poor | Poor |
| | 3 | 3 | 30 | 30 | 200 | 22 | Poor | Poor |
| | 4 | 3 | 31 | 30 | 250 | 22 | Poor | Poor |
| | 5 | 19 | 30 | 30 | 200 | −23 | Poor | Poor |
| | 6 | 19 | 31 | 30 | 250 | −23 | Poor | Poor |
| | 7 | 20 | 30 | 30 | 200 | −23 | Poor | Poor |
| | 8 | 20 | 31 | 30 | 250 | −23 | Poor | Poor |
| | 9 | 1 | 8 | 5 | 1000 | 48 | Good | Poor |
| | 10 | 1 | 8 | 30 | 9000 | 48 | Good | Poor |

The present invention was described on the basis of the above embodiment and examples, but the present invention is not limited to the content of the above embodiment and examples, and as long as it does not deviate from the claimed invention, the content of the above embodiment and examples can be changed appropriately.

INDUSTRIAL APPLICABILITY

Using the present invention makes brazing joining possible for automobile heat exchangers, but also for aluminum-made heat exchangers, coolers, heat sinks, radiators etc. used in railway vehicles, airplanes, electronic components such as inverters and CPU and the like, various plants, industries and air conditioning appliances and the like, without using flux. Since flux is not used in the present invention, there is no decrease in the surface quality or the surface chemical conversion treatment due to flux residues after brazing, and no failure of the electric element due to contamination caused by the residues.

REFERENCE SIGNS LIST 1 brazing sheet
2 aluminum alloy core material
3 aluminum alloy brazing filler metal
3a intermediate brazing filler metal layer
3b outermost surface brazing filler metal layer

The invention claimed is:
1. A brazing sheet for flux-free brazing, comprising:
an outermost surface brazing filler metal layer, consisting of an Al—Si-based alloy comprising 2 to 13% Si in mass %; and
an intermediate brazing filler metal layer consisting of an Al—Si—Mg-based alloy containing 4 to 13% Si and 0.1 to 5.0% Mg in mass %,
wherein the outermost surface brazing filler metal layer and the intermediate brazing filler metal layer are cladded on one or both sides of a core material,
wherein, in the outermost surface brazing filler metal layer, a number of Si particles having a circle equivalent diameter of 1.75 μm or more is 10% or more of a number of Si particles having a circle equivalent diameter of 0.8 μm or more, as observed in a direction of a surface layer, and
wherein the intermediate brazing filler metal layer contains less than 3000 per 10000 μm$^2$ of Si particles having a circle equivalent diameter of 0.25 μm or more, as observed in a cross section of the intermediate brazing filler metal layer.
2. The brazing sheet for flux-free brazing according to claim 1, wherein the Al—Si-based alloy of the outermost surface brazing filler metal layer contains Si in an amount of 2% or more and less than 4% in mass %.
3. The brazing sheet for flux-free brazing according to claim 1, wherein the Al—Si-based alloy of the outermost surface brazing filler metal layer further comprises 0.1 to 1.0% Fe in mass %.

4. The brazing sheet for flux-free brazing according to claim 1, wherein a liquidus temperature difference between the intermediate brazing filler metal layer and the outermost surface brazing filler metal layer is less than 50° C.

5. The brazing sheet for flux-free brazing according to claim 1, wherein cladding ratios of the outermost surface brazing filler metal layer and the intermediate brazing filler metal layer are 1 to 30% per side relative to an overall thickness of the brazing sheet, respectively.

6. The brazing sheet for flux-free brazing according to claim 1, wherein the Al—Si—Mg-based alloy of the intermediate brazing filler metal layer further comprises 0.01 to 0.5% Bi in mass %.

7. The brazing sheet for flux-free brazing according to claim 1, wherein the Al—Si-based alloy of the outermost surface brazing filler metal layer further comprises 0.01 to 0.5% Bi in mass %.

8. A method for flux-free brazing of aluminum members, wherein the aluminum members are joined to each other without using flux in a non-oxidizing gas atmosphere with an oxygen concentration of 100 ppm or less, using the brazing sheets for flux-free brazing according to claim 1.

9. A method for manufacturing a heat exchanger, wherein the aluminum members are joined to each other without using flux in a non-oxidizing gas atmosphere with an oxygen concentration of 100 ppm or less, using the brazing sheets for flux-free brazing according to claim 1.

10. The method according to claim 8, wherein the Al—Si—Mg-based alloy of the intermediate brazing filler metal layer further comprises 0.01 to 0.5% Bi in mass %.

11. The method according to claim 8, wherein the Al—Si-based alloy of the outermost surface brazing filler metal layer further comprises 0.01 to 0.5% Bi in mass %.

12. The method according to claim 9, wherein the Al—Si—Mg-based alloy of the intermediate brazing filler metal layer further comprises 0.01 to 0.5% Bi in mass %.

13. The method according to claim 9, wherein the Al—Si-based alloy of the outermost surface brazing filler metal layer further comprises 0.01 to 0.5% Bi in mass %.

* * * * *